US011966415B2

(12) United States Patent
Gollogly

(10) Patent No.: US 11,966,415 B2
(45) Date of Patent: Apr. 23, 2024

(54) MULTIMASTER DATABASE FOR IDENTITY AND ELECTRONIC MAIL IN DDIL ENVIRONMENTS

(71) Applicant: Microsoft Technology Licensing, LLC, Redmond, WA (US)

(72) Inventor: Jonathan James Gollogly, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 17/753,092

(22) PCT Filed: Sep. 18, 2020

(86) PCT No.: PCT/US2020/051443
§ 371 (c)(1),
(2) Date: Feb. 18, 2022

(87) PCT Pub. No.: WO2021/055717
PCT Pub. Date: Mar. 25, 2021

(65) Prior Publication Data
US 2022/0269696 A1    Aug. 25, 2022

(30) Foreign Application Priority Data

Sep. 18, 2019  (LU) .................................. LU101390

(51) Int. Cl.
*G06F 16/00* (2019.01)
*G06F 16/27* (2019.01)
*H04L 67/1095* (2022.01)

(52) U.S. Cl.
CPC ........ *G06F 16/273* (2019.01); *H04L 67/1095* (2013.01)

(58) Field of Classification Search
CPC ............ G06F 11/1451; G06F 2201/84; G06F 9/45558; G06F 11/1469; G06F 3/067;
(Continued)

(56) References Cited

U.S. PATENT DOCUMENTS 7,290,034 B2   10/2007  Budd et al.
8,527,461 B2    9/2013  Ducott et al.
(Continued)

FOREIGN PATENT DOCUMENTS

CN      104077181 A    10/2014
DE   102021113808 A1    1/2022

OTHER PUBLICATIONS

"Notice of Allowance Issued in European Patent Application No. 20781732.1", Mailed Date: Jun. 30, 2022, 6 Pages.
(Continued)

*Primary Examiner* — Shyue Jiunn Hwa

(57) ABSTRACT

The present invention generally relates to systems and methods for providing an enterprise user with an electronic identity and an electronic mailbox when the user has denied, degraded, intermittent, or latent network connectivity. In aspects, a database limited to a single user containing the user's electronic identity and electronic mailbox is provided. The single user database is replicated using a multi-master replication scheme across the cloud and on-premises servers. When a user is entering an environment with denied, degraded, intermittent, or latent network connectivity ("DDIL"), the single user database is replicated to a DDIL server. The user is provided access to their electronic identity and electronic mailbox in the single-user database via the DDIL server during periods of denied, degraded, intermittent, or latent network connectivity. The single user database can be replicated across the cloud/on-premises
(Continued)

servers during periods when network connectivity is established and adequate for replication.

20 Claims, 8 Drawing Sheets

(58) Field of Classification Search
CPC .......... G06F 2201/815; G06F 11/1464; G06F 11/2094; G06F 11/1453; G06F 3/065; G06F 11/2097; G06F 11/1458; G06F 11/1461; G06F 2009/45583; G06F 3/0604; G06F 2009/45579; G06F 2201/82; G02F 1/29; G02F 1/294; G02F 1/133345; G02F 1/134309; G02F 1/13439; G02F 1/133371; G02F 1/291; G02B 30/00; G02B 3/08; G02B 3/12; G02B 5/1828; G02B 3/14; A61B 6/4258; B23P 15/246; B29C 33/3835
See application file for complete search history.

(56) References Cited

U.S. PATENT DOCUMENTS

| | | | |
|---|---|---|---|
| 8,694,895 | B2 | 4/2014 | Sanchez et al. |
| 9,069,979 | B2 | 6/2015 | Srinivasan et al. |
| 10,057,084 | B2 | 8/2018 | Mithyantha et al. |
| 2005/0076086 | A1 | 4/2005 | Budd et al. |
| 2008/0189622 | A1 | 8/2008 | Sanchez et al. |
| 2014/0245178 | A1* | 8/2014 | Smith .................. H04L 51/216 715/753 |
| 2015/0170209 | A1* | 6/2015 | Smith ................ G06Q 30/0267 705/14.64 |
| 2017/0168903 | A1* | 6/2017 | Dornemann ........ G06F 11/2038 |
| 2018/0083967 | A1 | 3/2018 | Subramanian et al. |
| 2018/0092057 | A1 | 3/2018 | Yamashita et al. |
| 2019/0190917 | A1 | 6/2019 | Joe |

OTHER PUBLICATIONS

"About Google Cloud Directory Sync", Retrieved from: https://web.archive.org/web/20180523092647/https:/support.google.com/a/answer/106368, May 23, 2018, 2 Pages.

"Patterns for Authenticating Corporate Users in a Hybrid Environment", Retrieved from: https://cloud.google.com/architecture/patterns-for-authenticating-corporate-users-in-a-hybrid-environment, Mar. 20, 2019, 13 Pages.

"Single Sign-On", Retrieved from: https://web.archive.org/web/20190207015101/https:/www.idaptive.com/product/single-sign-on/, Feb. 7, 2019, 4 Pages.

Chen, et al., "Walnut: A Unified Cloud Object Store", in Proceedings of ACM SIGMOD International Conference on Management of Data, May 20, 2012, pp. 743-754.

Lewis, Jack, "On-Premises Active Directory: Can I Remove it and go Full Cloud?", Retrieved from: https://www.softcat.com/blog/on-premises-active-directory-can-i-remove-it-and-go-full-cloud, Retrieved on: Mar. 10, 2022, 4 Pages.

"Search Report and Written Opinion Issued in Luxembourg Application No. LU101390", dated May 25, 2020, 8 Pages.

Wasson, et al., "Manage Identity in Multitenant Applications", Retrieved from: https://web.archive.org/web/20190110124620/https://docs.microsoft.com/en-us/azure/architecture/multitenant-identity/, Jul. 21, 2017, 4 Pages.

"Office Action Issued in Indian Patent Application No. 202247021802", Mailed Date; Nov. 23, 2022, 7 Pages.

"Notice of Allowance Issued in European Patent Application No. 20781732.1", Mailed On Nov. 9, 2022, 7 Pages.

"Notice of Allowance Issued in European Patent Application No. 20781732.1", Mailed Date: Dec. 8, 2022, 2 Pages.

International Search Report for International Application No. PCT/US2020/051443 mailed Dec. 21, 2020 (3 pages).

International Written Opinion for International Application No. PCT/US2020/051443 mailed Dec. 21, 2020 (5 pages).

Office Action Received for Chinese Application No. 202080065746.4, mailed on Feb. 28, 2024, 27 pages (English Translation Provided).

* cited by examiner

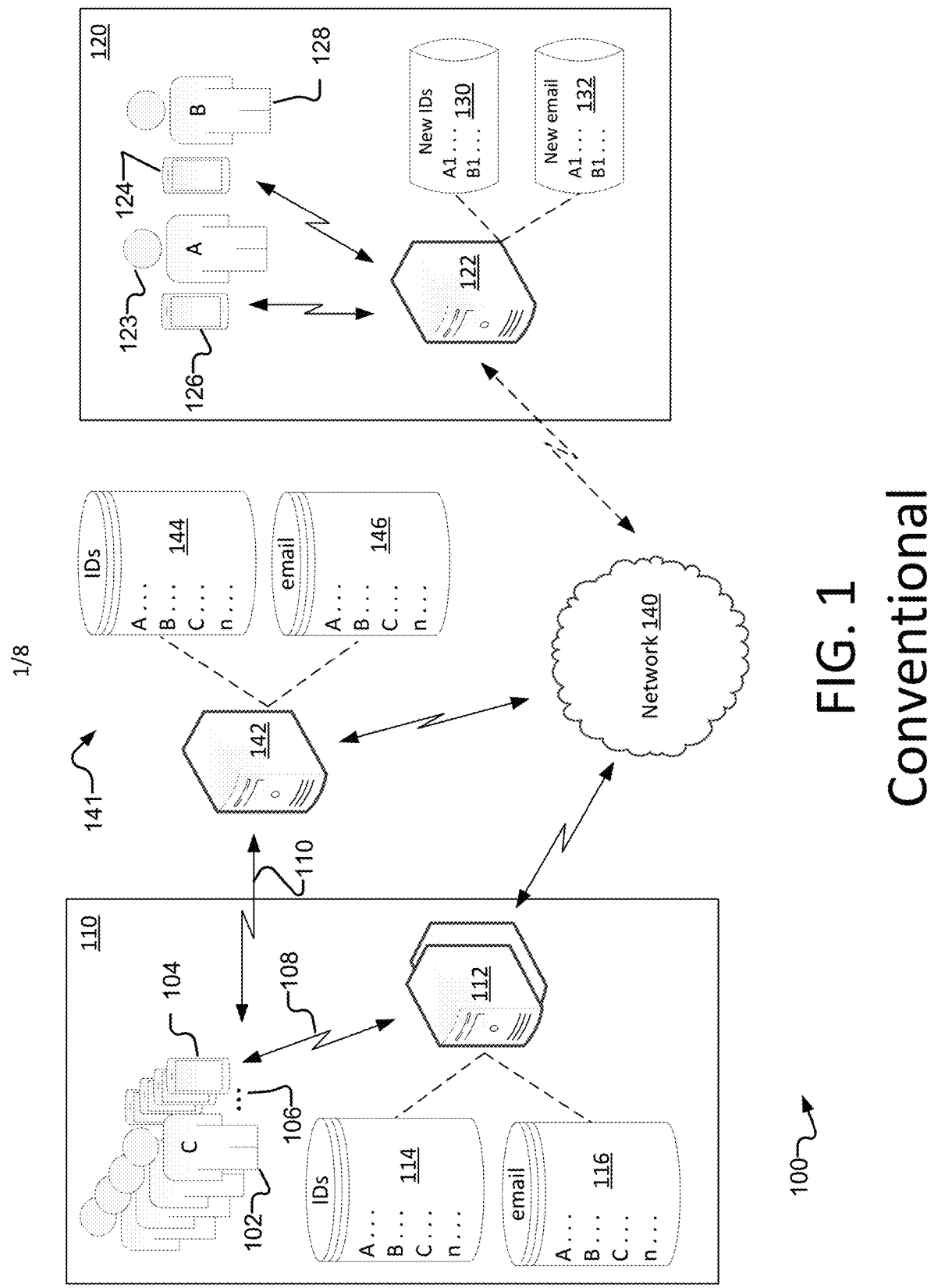
FIG. 1
Conventional

MULTIMASTER DATABASE FOR IDENTITY AND ELECTRONIC MAIL IN DDIL ENVIRONMENTS

CROSS-REFERENCE TO THE RELATED APPLICATIONS

This application is a National Stage Application of PCT/US2020/051443 filed Sep. 18, 2020, which claims benefit of Luxembourg Patent Application No. LU101390 filed Sep. 18, 2019, which applications are incorporated herein by reference. To the extent appropriate, a claim of priority is made to each of the above disclosed applications.

BACKGROUND

Enterprise directory services utilize multimaster databases to provide directory services to enterprise users. Typically, one database contains the electronic identities of all enterprise users and another database contains the email accounts for all the enterprise users. These two databases can be replicated across a plurality of network-linked servers in a cloud computing environment using a multi-master database replication scheme. Typically, these two databases are very large and enterprise users are required to have network connectivity, e.g. internet access, to access their electronic identities and email. However, in networking environments that have limited bandwidth, sporadic connectivity, and/or no connection to the internet, particularly for long periods of time, access to and use of such electronic mailboxes is not possible. For enterprise users who depend on enterprise resources such as an electronic mailbox, methods and systems are needed to access those same enterprise resources during periods of denied, degraded, intermittent, or latent ("DDIL") network connectivity.

It is with respect to these and other general considerations that aspects have been described. Also, although relatively specific problems have been discussed, it should be understood that the aspects should not be limited to solving the specific problems identified in the background.

SUMMARY

The disclosure generally relates to systems and methods for providing an enterprise user with a single electronic identity and a single electronic mail account/mailbox that may be used in a typical enterprise environment and may also be used when the user has denied, degraded, intermittent, or latent network connectivity. In aspects, the system provides a database that is limited to a single user—the single user database contains the user's electronic identity and electronic mail account/mailbox. The single user database is replicated using a multi-master replication scheme across the cloud and on-premises servers. When a user is entering an environment with denied, degraded, intermittent, or latent network connectivity ("DDIL"), the single user database is replicated to a DDIL server. The user is provided access to their electronic identity and electronic mailbox in the single-user database via the DDIL server during periods of denied, degraded, intermittent, or latent network connectivity. The user may continue to send and receive electronic mail from the user's single electronic mail account/mailbox to other users within the DDIL environment when there is no connection outside of the DDIL environment. Further, the single user database can be replicated across the cloud/premises servers during periods when network connectivity is established and adequate for replication. In this way, the same user identity and electronic mail account/mailbox may continue to be used as the user moves from the enterprise environment to a DDIL environment and back.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 1 illustrates a conventional system for providing electronic mail in a DDIL environment.

DETAILED DESCRIPTION

Figure 2:
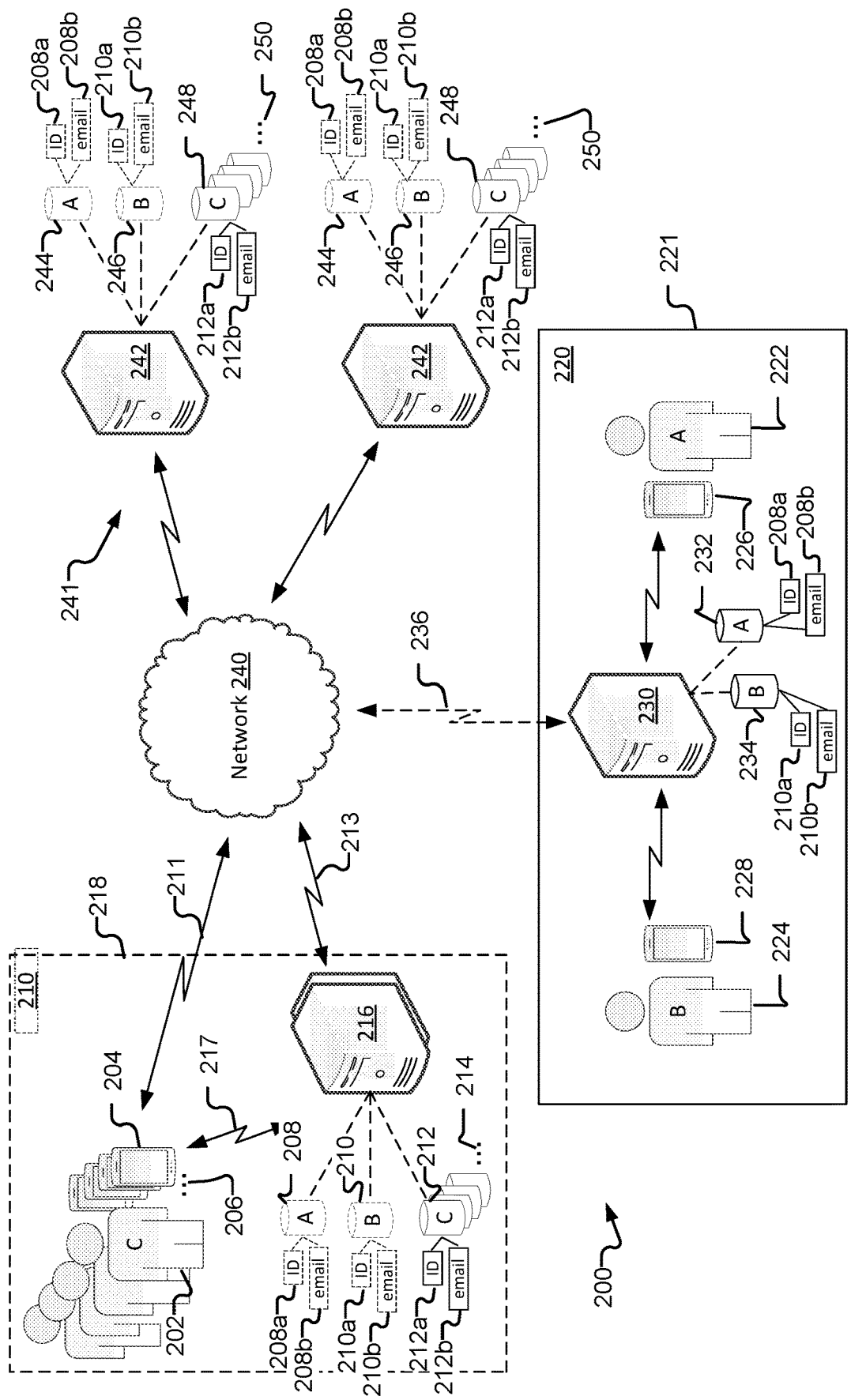
FIG. 2 illustrates a system for providing access to electronic mail in a DDIL environment according to aspects of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to systems and methods for providing an enterprise user with an electronic identity and an electronic mailbox when the user is within a DDIL environment. For purposes of this disclosure, a "DDIL" stands for "denied, delayed, intermittent, or latent" and describes an environment or network that that has limited bandwidth, sporadic connectivity and/or no connection to the internet, often for extended periods of time. The methods and systems described herein allow a user to access the user's main electronic mail account in a DDIL environment. As used herein, the terms "electronic mail account," "email account," "email mailbox," "electronic mailbox" are used interchangeably to mean an account: (i) that is associated with a user, (ii) that is uniquely identified by one or more email addresses (e.g., aliases); (iii) that includes one or more mailboxes, which store email messages sent from or received by the email address(es) associated with the account. In aspects, the email account may be an on-premises account or a cloud-based account. Such systems and methods use a per-user database that is limited in size and includes the user's same electronic identity and same email account that a user uses in non-DDIL environments including on-premises environments and/or cloud environments.

In contrast, typical enterprise directory service databases are large and include data associated with hundreds, thousands, or more users. Such large databases are not designed for users operating in environments with denied, degraded, intermittent, or latent network connectivity and for whom access to enterprise resources, such as email, is mission critical.

FIG. 1 illustrates a conventional system 100 for providing electronic mail in a DDIL environment. An enterprise 110 includes any number of users 102, such as users C ... n with any number of client computer devices 104 as illustrated by the ellipses 106. Users A 123 and B 124 are typically part of enterprise network environment 110, but have moved to a DDIL environment 120. Such environments often have hundreds to thousands to hundreds of thousands of users and devices. The client devices 104 connect to on-premises servers 112 via connection 108 and/or a cloud environment 141 via connection 110. The enterprise network environment 110 connects to the cloud environment via network 140. The enterprise environment 110 utilizes two huge databases to provide identity and email services. Database 114 includes electronic identity information for all of the users A 123, B 124, C ... n 102. The electronic identity information in database 114 includes everything a user needs to access all enterprise services, such as name, contact info, location, title, managers, reports, login ID, user ID, passwords, security credentials, title, groups, group types, domains, permissions, departments, display name, memberships, initials, resources, archive status, delegates, restrictions, GUID of the user's mailbox, email type, identity of server activated for email, security information, policies, device IDs, title, user certificates, and home pages. Database 116 includes the email accounts for all of the users in the enterprise. For a user 102 to access their email account from their device 104, they must have an active connection to both databases 114 and 116. For cloud-based email accounts, databases 114 and 116 are replicated and synchronized across network 140 using a multi-master replication scheme. In this way, cloud-based users 102 access their email by connecting to any of servers 112 and 142. However, such multi-master replication schemes are very difficult, if not impossible, to use within DDIL environments, such as DDIL environment 120, due to the size of the databases 114 and 116, the limited connection to network 140, and duration that the DDL environment 120 is disconnected from network 140. It is time-consuming to replicate such databases to the DDIL server 122 from servers 112 and/or 142 and problematic to synchronize such databases when the DDIL server actually has a connection to network 140. Often synchronization fails. The larger the email mailbox the higher the probability that synchronization will fail. Even if synchronization ultimately succeeds, it is time-consuming and the user may not use their email accounts during the process. Further, there is a risk that when DDIL servers that try, and fail, to synchronize databases 114 and 116, the DDIL servers fail and be unable to recover functionality in the DDIL in the DDIL environment. Failure of a DDIL server would cause the users in the DDIL environment to lose all email functionality with each other until a reliable connection was reestablished.

Because of the difficulty in replicating and synchronizing multi-user databases like databases 114 and 116 in a DDIL environment, conventional systems create new databases 130, 132 on a DDIL server 122 with new identities (e.g., A1, B1) for users A 123 and B 124 and new email accounts (e.g., A1, B1) for users who move to the DDIL environment 120. Often these new accounts are not synchronized with the on-premises databases 114, 116 or the cloud databases 144, 146. Instead, the DDIL users use the new accounts while in the DDL environment and then switch back to their existing accounts (e.g., A, B) in databases 114, 116 when they return to the enterprise environment 110. Indeed, this system often requires a user to have a new identity and email account every time he or she is deployed in a DDIL environment.

FIG. 2 illustrates a system 200 in which aspects of the present disclosure can be implemented. In the illustrated example, the environment includes an enterprise network environment 210, a cloud computing environment 241, and a DDIL environment 220.

The enterprise environment 210 includes multiple users 202, such as User C, where each user has one or more client computing devices 204 that are connected to on-premises servers 216 within the enterprise environment 210 as via connection 217. Connection 217 represents a Local Area Network (LAN), a Wide Area Network (WAN), the Internet, or other wireless and wired transmission mediums. This list is exemplary only and should not be considered as limiting. There are any number of users and client devices as designated by the ellipses 206. In some aspects, the enterprise environment 210 is secure as designated by the dashed line 218.

The enterprise network environment 210 utilizes a network 240 for data communication with the cloud computing environment 241. In the example shown, the cloud computing environment 241 includes a plurality of cloud servers 242 connected through the network 240 via connection 213. In some aspects, the network 240 can represent an at least partially public network such as the Internet. In some aspects, the network 240 is a computer network such as an enterprise intranet. In this regard, the network 240 can include a Local Area Network (LAN), a Wide Area Network (WAN), the Internet, wireless and wired transmission mediums. In further aspects, the servers 242 can communicate with some components of the system via a local network (e.g., an enterprise intranet), whereas the servers 242 can communicate with other components of the system via a wide area network (e.g., the Internet). In addition, the aspects and functionalities described herein operate over distributed systems (e.g., cloud-based computing systems), where application functionality, memory, data storage and retrieval, and various processing functions are operated remotely from each other over a distributed computing network, such as the Internet or an intranet.

The client computing devices 204 can include any computing device, such as a mobile computing device, a laptop computer, a mobile phone, a tablet, a smart watch, a wearable computer, a personal computer, a desktop computer, and the like. This list is exemplary only and should not be considered as limiting. Any suitable client computing device for connecting to a networks can be utilized. The client computing device 204 can connect to the cloud computing environment 241 through a connection 211 to the network 240 and/or through connection 217 to on-premises servers 216 to access various services such as the user's 202 electronic identity and email. In some aspects, the client computing device 204 can connect to the on-premises server 216 through the network 240, and in some aspects the client computing device 204 can connect to the on-premises server through an alternate connection, e.g. the connection 217. In aspects, enterprise environment 210 is a secure environment as designated by dashed line 218.

In the example shown, the enterprise environment 210 provides e-mail services to users 202 on their client devices 204. To provide these services, on-premises servers 216 (e.g., a server forest) include a small database 208, 210, 212, 214 for each user in the enterprise environment 210. The ellipses 214 indicate that there are any number of single user databases, one for each user 202 in enterprise system 210. In the aspect shown, the databases 208, 210, 212, 214 are limited to a single user and include an electronic identity and an electronic mailbox, e.g. email, of one enterprise user. So for example, user A 222 has database 208 with User A's electronic identity 208a and email mailbox 208b. User B 224 has database 210 with User B's electronic identity 210a and email mailbox 210b. User C has database 212 with User C's electronic identity 212a and email mailbox 212c, and so on as shown by ellipses 206 and 214. As used herein, "electronic identity information" or "identity" means any information a user needs to access their e-mail account. Examples of identity information include, without limitation, login ID, password, name, contact info, location, title, managers, reports, user ID, security credentials, title, groups, group types, domains, permissions, departments, display name, memberships, initials, resources, archive status, delegates, restrictions, GUID of the user's mailbox, email type, identity of server activated for email, security information, policies, device IDs, title, user certificates, and home pages.

Per user databases 208, 210, 212, 214 may use any database technology, including without limitation, B-tree databases, such as an Extensible Storage Engine (ESE), which is an ISAM (indexed sequential access method) data storage technology. As illustrated in FIG. 2, the per-user databases 212 can be replicated across the plurality of servers 242 in the cloud computing environment 241. In some aspects, the per-user database 242 can be replicated via a multi-master replication scheme in which all members of the group of computers 216, 242 storing the per-user databases 208, 210, 212, 214 are responsive to client device 204 queries regarding the data included in the per-user database 208, 210, 212, 214. In some aspects, the per-user database 208, 210, 212, 214 are formed by extracting one or both of a single user's electronic identification and electronic mailbox from an existing database (such as databases 114, 116, 144, 146 in FIG. 1) and including or associating the single user's electronic identification and electronic mailbox with the per-user databases 208, 210, 212, 214. The per user databases 208, 210, 212, 214 are intended to contain exact copies of each user's identity and email mailbox. So for example, cloud servers 224 have a replica 244 of User A 222's database 208 with user A 222's identity 208a and email mailbox 208b. Cloud servers 224 have a replica 246 of User B 224's database 210 with user B 224's identity 210a and email mailbox 210b. Cloud servers 224 have a replica 248 of User C 204's database 212 with user C 204's identity 212a and email mailbox 212b. In aspects, per-user databases contain encrypted information.

In this example, user A 222 and user B 224, who are typically associated with enterprise environment 210, have moved to DDIL environment 220. The DDIL environment 220 includes a DDIL server 230 (or server forest) that provides services to user A 222's client computing device 228 and user B 224's client computing device 228 through connections to the DDIL server 230. Typically, the DDIL environment is a secure as shown by box 221. In some aspects, the DDIL server 230 is a member the enterprise network environment 210 and can be connected to the on-premises servers 216 through network 240 as shown by network connection 236. In aspects, the DDIL server 230 is also a member of the cloud computing environment 241 and is connected to the plurality of cloud servers 242 through the network 240 by a network connection 236.

In some aspects, the DDIL environment 220 can include a location such as a building. In other aspects, the DDIL environment 220 can include a region or area, such as the political boundaries of a nation, state, province, etc., or a geographical area such as a desert, forest, sea, or ocean. In some aspects, the DDIL environment 220 is a location in which the connections 142 and 144 can be denied, degraded, intermittent or latent. For example, the DDIL environment 220 can be a military vehicle deployed in a foreign country, or a military vessel such as an aircraft carrier at sea.

The DDIL environment often has denied, delayed, intermittent, or latent connections to network 240 as shown by dashed line connection 236. The loss of connectivity results from any number of factors including without limitation: (i) a lack of the ability to engage in trusted, private information exchanges, (ii) network connectivity is lost or disconnected for protracted periods of time, (iii) low bandwidth causes network throughput to be very low, (iv) only a portion of the network is available, (v) the connection is unreliable causing a large number of messages to be lost or corrupted, (vi) the DDIL environment is moving or in a remote location. Typically, the loss of connection occurs for an extended period of time, e.g., weeks to months. In some aspects, the loss of connection is unexpected, such as when a satellite connection goes down.

In the example shown, the DDIL server 230 computer includes per-user databases for each user that is part of the DDIL network environment 220. The per-user databases 232, 234 were replicated from the on-premises server 216. For example, the DDIL server 230 includes a replica 232 of database A 208 for user A 222 and a replica 234 of database B 210 for user B 224. The replicas 232 and 234 contain the same user identities and email mailboxes as the on-premises servers 216 and/or cloud servers 242. For example, replica per user database 232 contains user A 222's identity 208a and email mailbox 208b. Replica per user database 234 contains user A 224's identity 210a and email mailbox 210b. In this way, users within the DDIL environment 220 continue to use their same electronic identities and same e-mail mailboxes while in the DDIL environment as they use while in the enterprise environment 210. In aspects, these per-user databases are replicated to the DDIL server 230 in anticipation of users A 222 and user B 224 moving to the DDIL environment. Further, the per-user databases 232, 234 are replicated across the on-premises servers 216 and/or the cloud servers 242 via a multi-master replication scheme when the DDIL server 230 has a connection to network 240. An administrator within the DDIL environment 220 has the ability to manage the per user databases 232, 234 while users A 222 and B 224 are in the DDIL environment 220. These changes are also be synchronized when the connection 236 is active and/or when users A 222 and/or B 224 return to the enterprise environment 210.

Advantages to system 200 include that Users A 222 and B 224 has the ability to access and use their same email mailboxes in databases 232, 234 even while connection 236 has limited bandwidth, sporadic connectivity, or no connection to the internet. Further, users A 222 and B 224 and any other user in the DDIL environment 220 have the ability to continue to communicate via DDIL server 230 with all other users within the DDIL environment 220 even when there is no connection 236 to the network 240. While the connection 236 is lost, the per-user databases for users in the DDIL environment 220 continue to operate, e.g. receive mail, policy changes, updates, even though they are not in active use by the users within the DDIL environment. The replicas of the per-user databases on the on-premises server 216 and cloud servers 242 are in effect in a ghost mode as designated by the dashed lines for User A 222's databases 208, 244 and User B 224's databases 210, 246. Once a connection 236 is established and/or users A 222 and/or user B 224 return to enterprise environment 210, their per-user databases are easily and quickly synchronized using a multi-master replication scheme to the on-premises servers 216 and/or the servers 242 in the cloud environment. Synchronization of the much smaller per-user databases is much easier to synchronize when the connection 236 is live than trying to synchronize much larger, multi-user databases (such as databases 114, 116 in FIG. 1). The problem of synchronizing of large multi-user databases becomes even more problematic when the connection 236 is down for an extended period of time. By making the databases smaller and limited to single users, synchronization when connection 236 restored is much faster and much easier than conventional systems. The synchronizing of the per-user databases from the DDIL environment 220 to the enterprise environment 210 and/or cloud environment 241 has further advantages in that it may be throttled in a number of ways, including by prioritizing which per-user databases are synchronized first. In another aspect, user A 222 leaves the DDIL environment 220 but user B 224 does not. The presently described system allows for synchronization of user A 222's database 232 with databases 208 and/or 244 without requiring synchronization of user B's database 234 with databases 210 and/or 246. The ability to synchronize some user's emails without others was problematic and slow in prior systems. Even further, because the per-user databases include both the user's identity and email mailbox, synchronizing is further optimized to allow users to quickly and seamlessly switch from the DDIL environment to other environments and back while using the same e-mail accounts and mailboxes.

As should be appreciated, the various devices, components, etc., described with respect to FIG. 2 are not intended to limit the systems and methods to the particular components described. Accordingly, additional topology configurations may be used to practice the methods and systems herein and/or some components described may be excluded without departing from the methods and systems disclosed herein.

Figure 3:
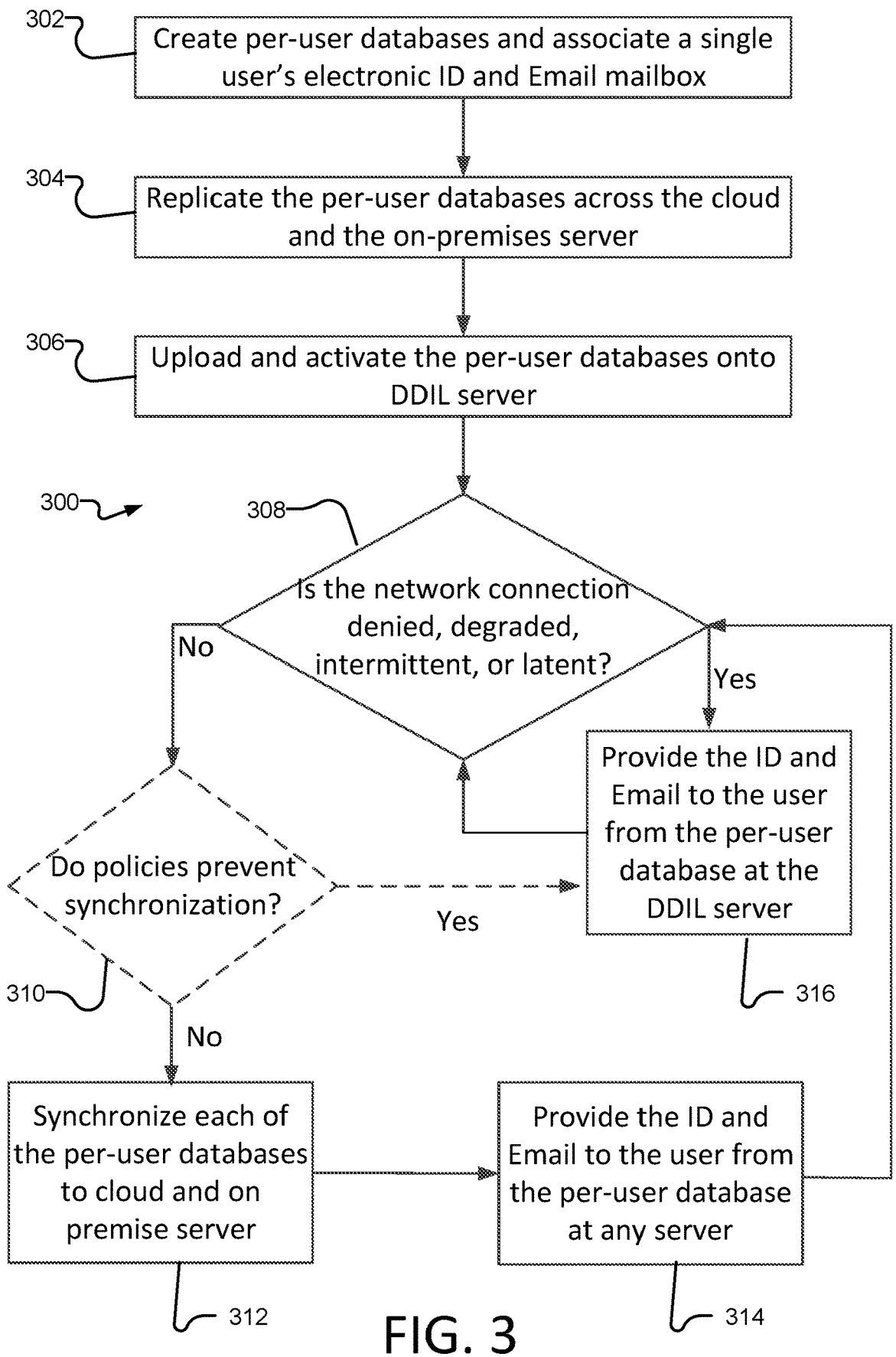
FIG. 3 is a flowchart of a method for providing a per-user database in an enterprise network, according to an example aspect of the present disclosure.

FIG. 3 is a flowchart of a method 300 for providing a per-user database in system such as system 200, according to an example aspect of the present disclosure.

Method 300 begins with operation 302, where a plurality of per-user databases 208, 210, 212, 214 (FIG. 2) are created. In aspects, an electronic identity (e.g., 208*a*, 210*a*) and an electronic mailbox (e.g., 210*a*, 210*b*) of a single user (e.g., user A 222, user B 224, and users C . . . n 202 in FIG. 2) is associated with a per-user or single database (e.g., databases 208, 210, 212, 214 in FIG. 2). This is accomplished by creating per user databases from scratch or by dividing and combining large databases (like databases 114 and 116 in FIG. 1) into much smaller per-user databases that each include a user identity and email mailbox for a single user.

At operation 304, the single user databases 208, 210, 212, 214 (FIG. 2) can be replicated across the servers (e.g., servers 242 in FIG. 2) in a cloud computing environment (e.g., 241 in FIG. 2) as well as the on-premises servers 216 (FIG. 2). In some aspects, operation 304 can utilize a multi-master replication scheme, and the single user databases 208, 210, 212, 214 (FIG. 2) can be updated and replicated asynchronously.

At operation 306, single user databases for all users (e.g., user A 222 and user B 224) who are entering a DDIL environment 220 are replicated to and activated onto a DDIL server 230. At this time, an administrator in the DDIL environment 220 is responsible for managing the single user databases 234, 236 (FIG. 2).

At 308, it is be determined whether the network connection between the DDIL server 230 the network 240 is denied, degraded, intermittent, or latent. If the answer is NO, the method 300 proceeds to optional operation 310 or to operation 312. At 310, it is determined whether there is a policy in place that would prevent a user from synchronizing to the on-premises server 216 and/or the cloud servers 242 via network 240. This is an optional operation as designated by the dashed lines. If the answer is NO or there are no policies in place in this regard, the method 300 proceeds to operation 312 where the per-user databases 234, 236 are synchronized to the cloud servers 242 and/or on-premises servers 216 via network 240. The synchronization may be synchronous or asynchronous. It may be throttled or not. It may involve all of the users within the DDIL environment or not. At operation 314, users A 222 and B 224 within the DDIL environment 220 are provided with their email on their client devices 228, 226 through the network 240, and can access the electronic identity and email associated with the per-user databases 208, 210, 234, 236, 244, 246 replicated on any of the DDIL server 230, the cloud servers 242, or the on-premises server 216. The operation then proceeds back to operation 308.

If the answer to determination operation 308 is YES, the method 300 provides per-user database data from the DDIL server and can access the electronic identity and email associated with the per-user database 234, 236 replicated on the DDIL server 230. At this point, the users within DDIL environment communicate via email with each other but cannot communicate via email with users outside of the DDIL environment 220. The method 300 then proceeds back to operation 308.

As should be appreciated, operations 302-316 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 4-8 and the associated descriptions provide a discussion of a variety of operating environments in which aspects of the disclosure are practiced. However, the devices and systems illustrated and discussed with respect to FIGS. 4-8 are for purposes of example and illustration and are not limiting of a vast number of computing device configurations that may be utilized for practicing aspects of the disclosure, as described herein.

Figure 4:
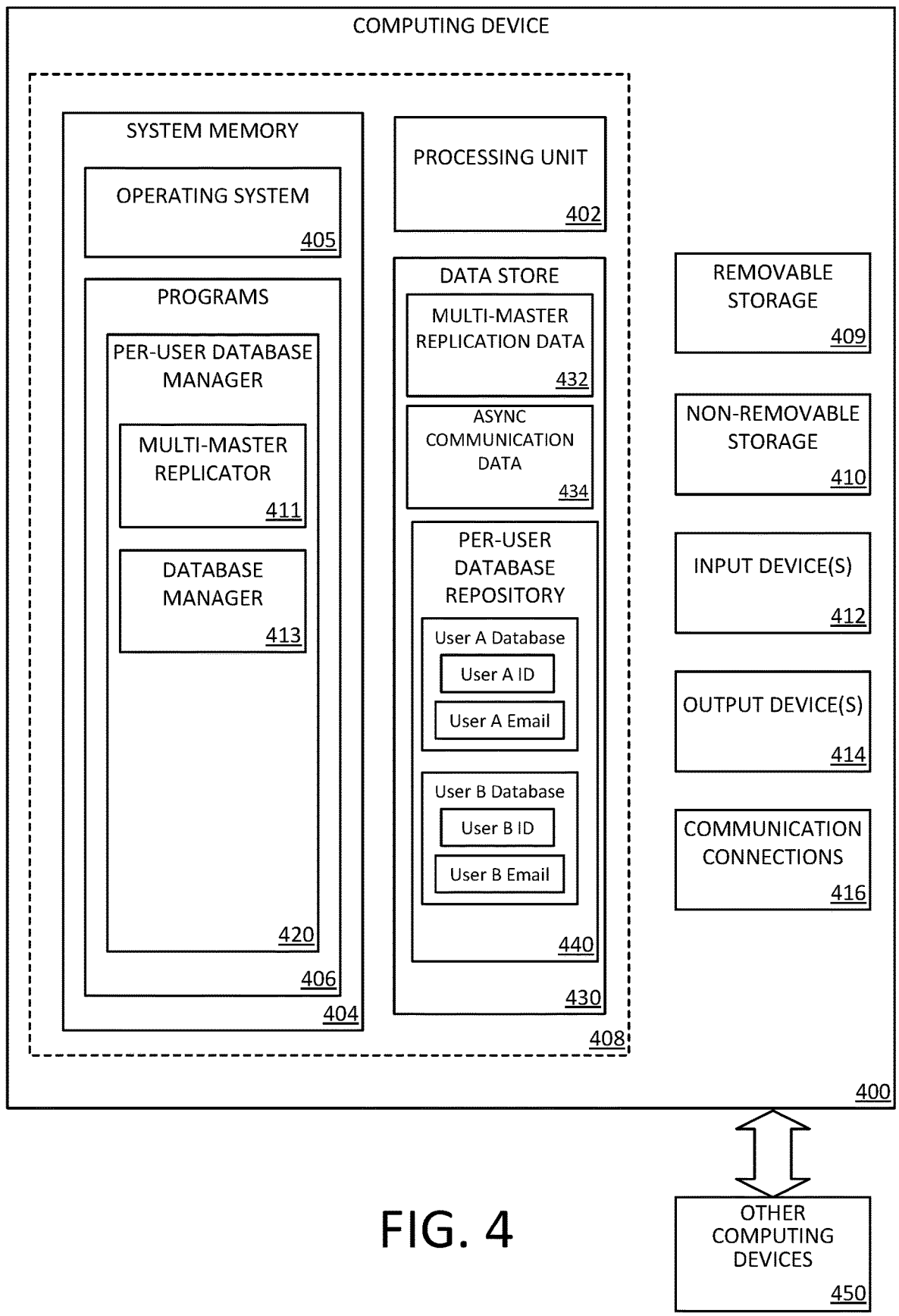
FIG. 4 is a block diagram illustrating example physical components of a computing device, according to an example aspect of the present disclosure.

FIG. 4 is a block diagram illustrating physical components (e.g., hardware) of a computing device 400 with which aspects of the disclosure are practiced. The computing device components described below have computer executable instructions for implementing a per-user database management application 420 on a computing device (e.g., server computing devices 142 and 144), including computer executable instructions for the per-user database management application 420 that can be executed to implement the methods disclosed herein. In a basic configuration, the computing device 400 includes at least one processing unit 402 and a system memory 404. Depending on the configuration and type of computing device, the system memory 404 comprises, but is not limited to, volatile storage (e.g., random access memory), non-volatile storage (e.g., read-only memory), flash memory, or any combination of such memories. The system memory 404 includes an operating system 405 and one or more programs 406 suitable for running the per-user database management application 420, such a multi-master replicator program 411 and a database manager program 413.

The operating system 405, for example, is suitable for controlling the operation of the computing device 400. Furthermore, aspects of the disclosure are practiced in conjunction with a graphics library, other operating systems, or any other application program and is not limited to any particular application or system. This basic configuration is illustrated in FIG. 3 by those components within a dashed line 408. In aspects, the computing device 400 has additional features or functionality. For example, the computing device 400 also includes additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files are stored in the system memory 404. While executing on the processing unit 402, the program modules 406 (e.g., the per-user database management application 420) performs processes including, but not limited to, the aspects, as described herein. Other program modules that are used in accordance with aspects of the present disclosure, and in particular for providing a per-user database 102, include the multi-master replicator program 411 and a database manager program 413, etc. The system memory 404 is in communication with a local data store 440 such that while executing on the processing unit 402, the program modules 406 access data in the data store 440. In the example shown, the data store 440 includes multi-master replication data 442, asynchronous communication data 444, and a per-user database repository 440 storing one or more per-user databases 102 associated with individual users, such as the user 124. Although the aspect illustrates two per-user databases, e.g. the User A Database and the User B Database, fewer or more per-user databases 102 can be stored in the per-user database repository 440.

Furthermore, aspects of the disclosure are practiced in an electrical circuit comprising discrete electronic elements, packaged or integrated electronic chips containing logic gates, a circuit utilizing a microprocessor, or on a single chip containing electronic elements or microprocessors. For example, aspects of the disclosure are practiced via a system-on-a-chip (SOC) where each or many of the components illustrated in FIG. 4 are integrated onto a single integrated circuit. Such an SOC device includes one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols is operated via application-specific logic integrated with other components of the computing device 400 on the single integrated circuit (chip). Aspects of the disclosure are also practiced using other technologies capable of performing logical operations such as, for example, AND, OR, and NOT, including but not limited to mechanical, optical, fluidic, and quantum technologies. In addition, aspects of the disclosure are practiced within a general purpose computer or in any other circuits or systems.

The computing device 400 also has one or more input device(s) 412 such as a keyboard, a mouse, a pen, a sound or voice input device, a touch or swipe input device, etc. The output device(s) 414 such as a display, speakers, a printer, etc. are also be included. The aforementioned devices are examples and others may be used. The computing device 400 includes one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein includes computer storage media. Computer storage media includes volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media includes RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. In aspects, any such computer storage media is part of the computing device 400. Computer storage media does not include a carrier wave or other propagated or modulated data signal.

Communication media is embodied by computer readable instructions, data structures, program modules, or other data in a modulated data signal, such as a carrier wave or other transport mechanism, and includes any information delivery media. The term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 5:
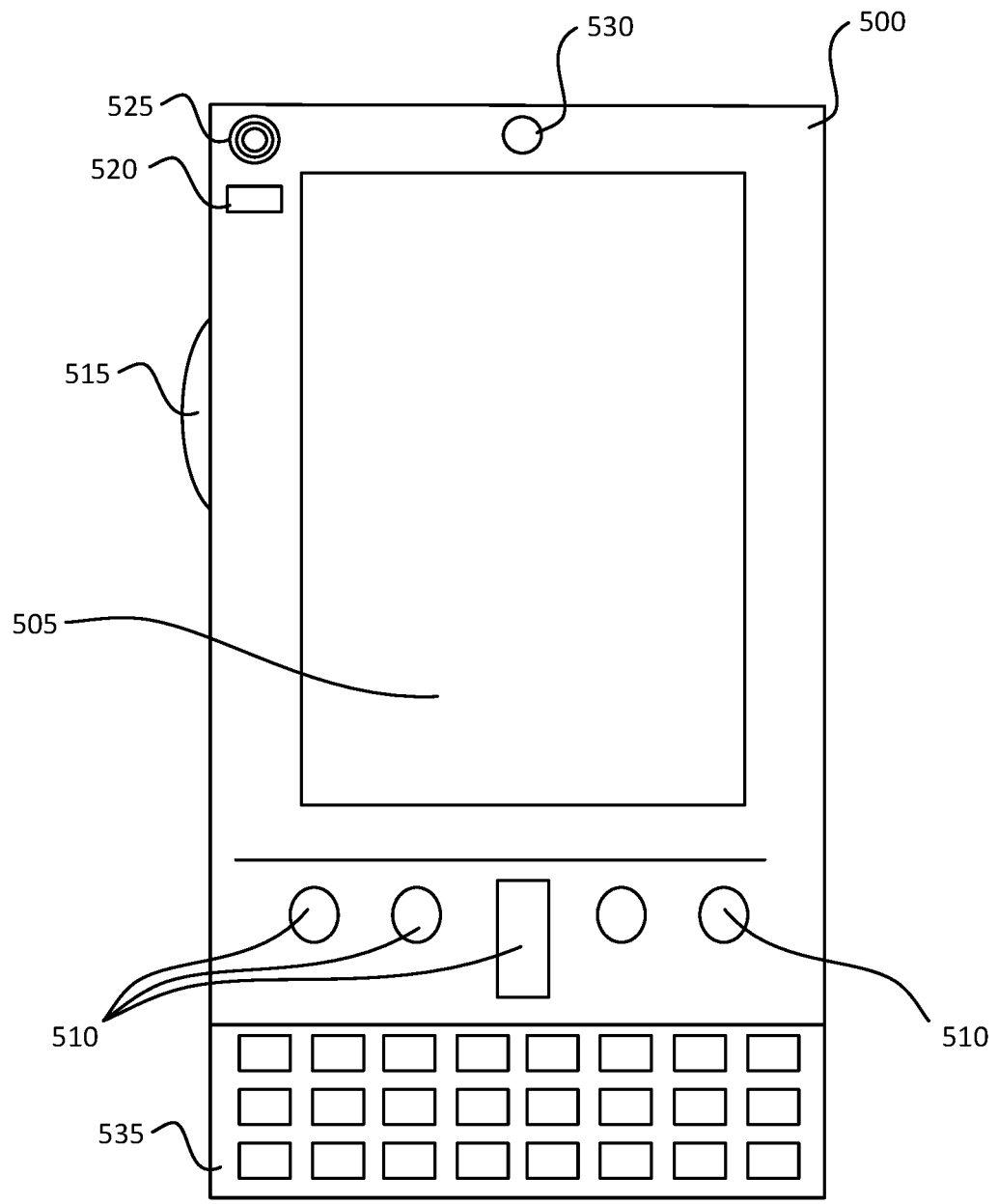
FIG. 5 simplified block diagrams of a mobile computing device, according to an example aspect of the present disclosure.
Figure 6:
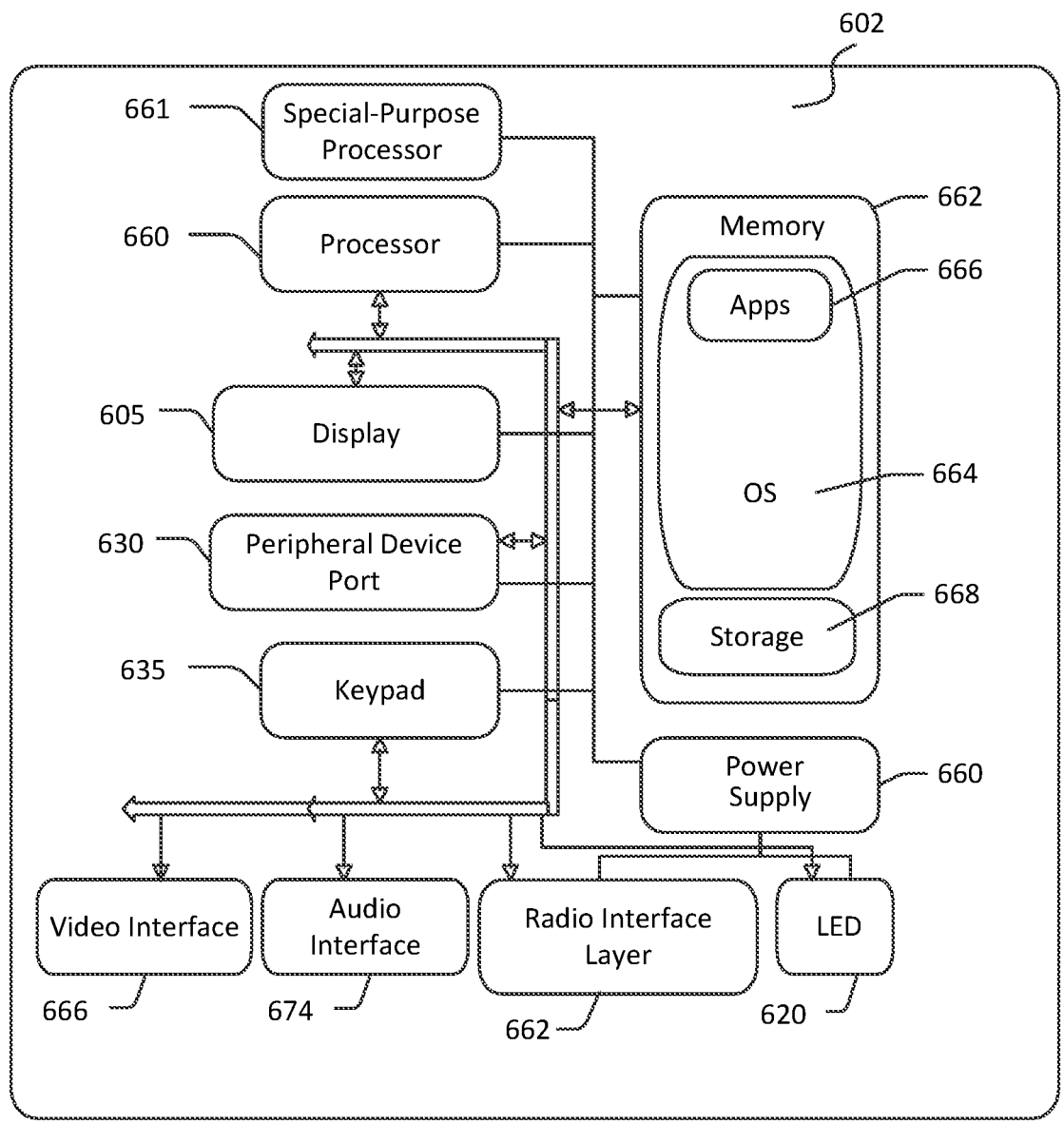
FIG. 6 is an exemplary tablet computing device 800, according to an example aspect of the present disclosure.

FIGS. 5-6 illustrate a mobile computing device 500, for example, a mobile telephone, a smart phone, wearable computer (such as a smart watch), a tablet computer, a laptop computer, and the like, with which aspects of the disclosure may be practiced. With reference to FIG. 5, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 also functions as an input device (e.g., a touch screen display). If included, an optional side input element 515 allows further user input. The side input element 515 is a rotary switch, a button, or any other type of manual input element. In alternative aspects, mobile computing device 500 incorporates more or less input elements. For example, the display 505 is not be a touch screen in some aspects. In yet another alternative aspect, the mobile computing device 500 is a portable phone system, such as a cellular phone. The mobile computing device 500 also includes an optional keypad 535. Optional keypad 535 is a physical keypad or a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 6 is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 is used to store persistent information that should not be lost if the system 602 is powered down. The application programs 666 use and store information in the non-volatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications are loaded into the memory 662 and run on the mobile computing device 600, including the instructions for providing a consensus determination application as described herein (e.g., message parser, suggestion interpreter, opinion interpreter, and/or consensus presenter, etc.).

The system 602 has a power supply 660, which is implemented as one or more batteries. The power supply 660 further includes an external power source, such as an AC adapter or a powered docking cradle that supplements or recharges the batteries.

The system 602 also includes a radio interface layer 662 that performs the function of transmitting and receiving radio frequency communications. The radio interface layer 662 facilitates wireless connectivity between the system 602 and the "outside world," via a communications carrier or service provider. Transmissions to and from the radio interface layer 662 are conducted under control of the operating system 664. In other words, communications received by the radio interface layer 662 are disseminated to the application programs 666 via the operating system 664, and vice versa.

The visual indicator 620 is used to provide visual notifications, and/or an audio interface 664 is used for producing audible notifications via an audio transducer 625 (e.g., audio transducer 625 illustrated in FIG. 5). In the illustrated aspect, the visual indicator 620 is a light emitting diode (LED) and the audio transducer 625 is a speaker. These devices are directly coupled to the power supply 660 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 664 is used to provide audible signals to and receive audible signals from the user. For example, in addition to being coupled to the audio transducer 625, the audio interface 664 is also be coupled to a microphone to receive audible input, such as to facilitate a telephone conversation. In accordance with aspects of the present disclosure, the microphone also serves as an audio sensor to facilitate control of notifications, as will be described below. The system 602 further includes a video interface 766 that enables an operation of peripheral device 630 (e.g., on-board camera) to record still images, video stream, and the like. Audio interface 664, video interface 766, and keyboard 635 are operated to generate one or more messages as described herein.

A mobile computing device 600 implementing the system 602 optionally has additional features or functionality. For example, the mobile computing device 600 also includes additional data storage devices (removable and/or non-removable) such as, magnetic disks, optical disks, or tape. Such additional storage is illustrated in FIG. 6 by the non-volatile storage area 668.

Data/information generated or captured by the mobile computing device 600 and stored via the system 602 is stored locally on the mobile computing device 600, as described above, or the data is stored on any number of storage media that are accessed by the device via the radio interface layer 662 or via a wired connection between the mobile computing device 600 and a separate computing device associated with the mobile computing device 600, for example, a server computer in a distributed computing network, such as the Internet. As should be appreciated such data/information is accessed via the mobile computing device 600 via the radio interface layer 662 or via a distributed computing network. Similarly, such data/information is readily transferred between computing devices for storage and use according to well-known data/information transfer and storage means, including electronic mail and collaborative data/information sharing systems.

As should be appreciated, FIGS. 5-6 are described for purposes of illustrating the present methods and systems and is not intended to limit the disclosure to a particular sequence of steps or a particular combination of hardware or software components.

Figure 7:
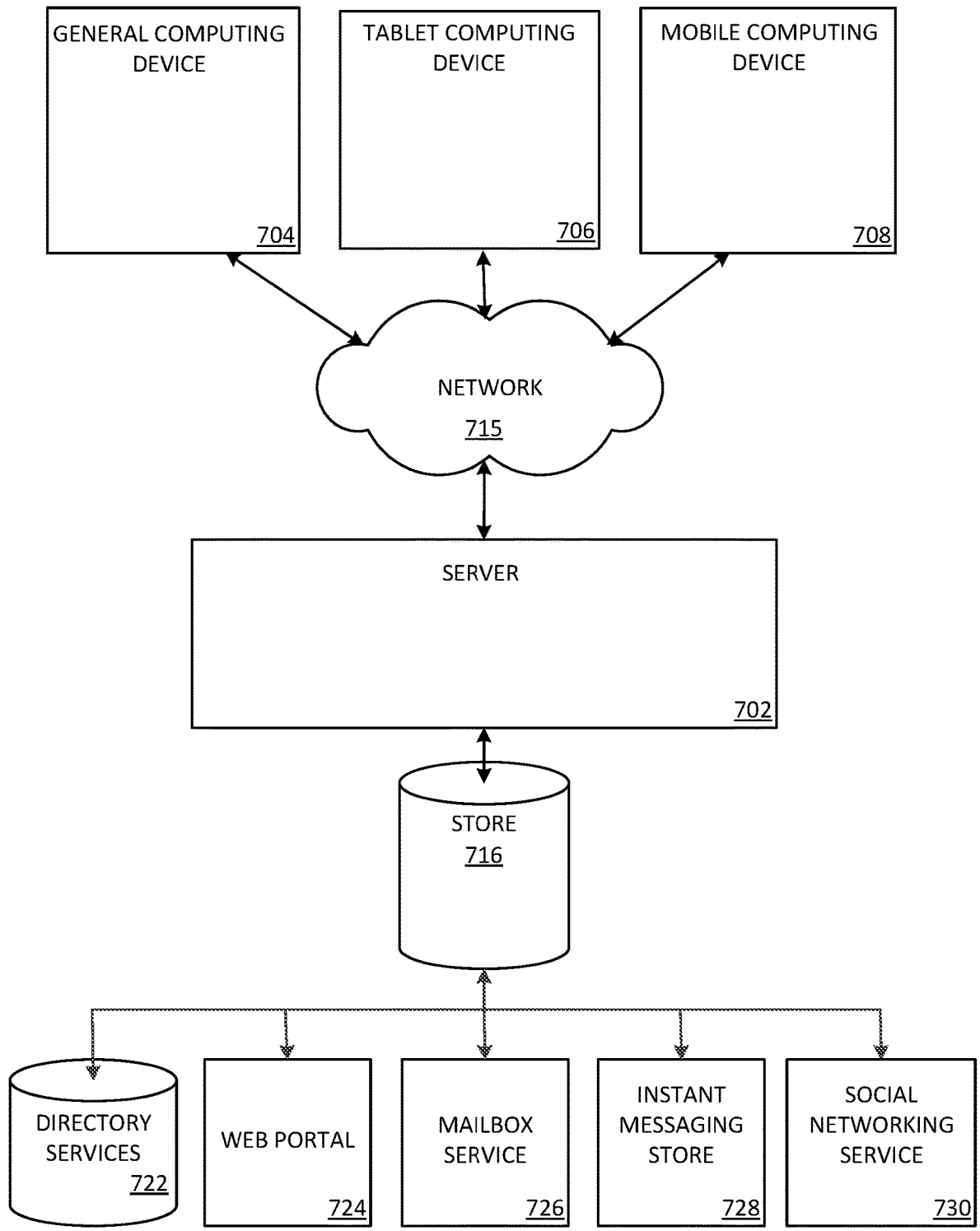
FIG. 7 is a simplified block diagram of a distributed computing system, according to an example aspect of the present disclosure.

FIG. 7 illustrates one aspect of the architecture of a system for processing data received at a computing system from a remote source, such as a general computing device 704 (e.g., personal computer), tablet computing device 706, or mobile computing device 708, as described above. Content displayed at server device 702 is stored in different communication channels or other storage types. For example, various messages are received and/or stored using a directory service 722, a web portal 724, a mailbox service 726, an instant messaging store 728, or a social networking service 730. The server device 702 provides data to and from a client computing device such as a general computing device 704, a tablet computing device 706 and/or a mobile computing device 708 (e.g., a smart phone) through a network 715. By way of example, the computer system described above with respect to FIGS. 1-4 is embodied in a general computing device 704 (e.g., personal computer), a tablet computing device 706 and/or a mobile computing device 708 (e.g., a smart phone). Any of these aspects of the computing devices obtain content from the store 716, in addition to receiving graphical data useable to either be pre-processed at a graphic-originating system or post-processed at a receiving computing system.

As should be appreciated, FIG. 7 is described for purposes of illustrating the present methods and systems and is not intended to limit the disclosure to a particular sequence of steps or a particular combination of hardware or software components.

Figure 8:
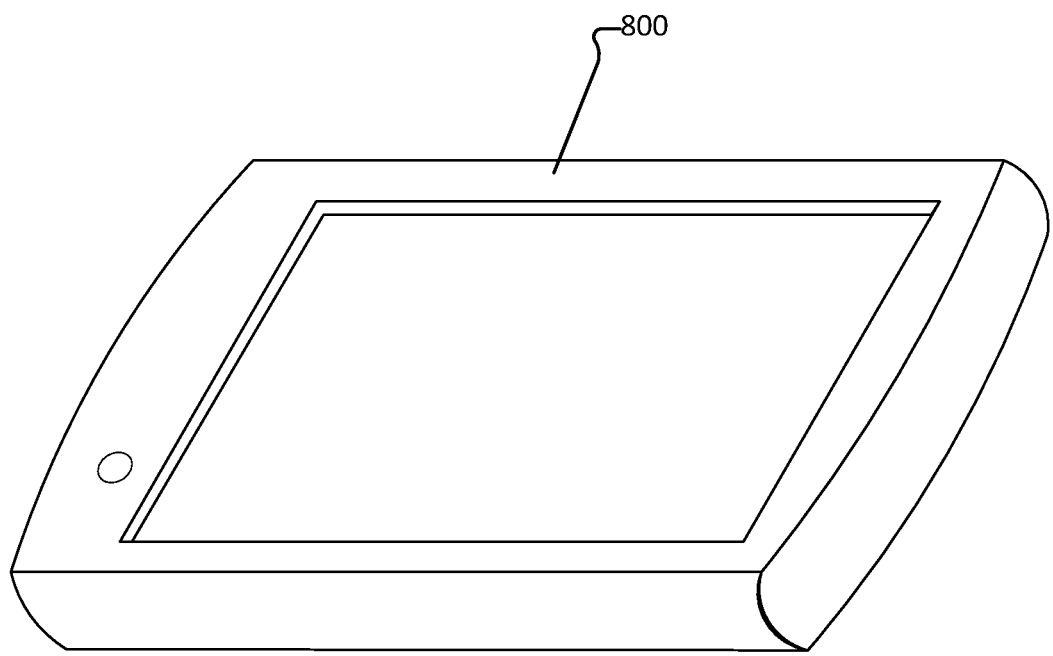
FIG. 8 illustrates a tablet computing device, according to an example aspect of the present disclosure.

FIG. 8 illustrates an exemplary tablet computing device 800 that executes one or more aspects disclosed herein. In addition, the aspects and functionalities described herein operate over distributed systems (e.g., cloud-based computing systems), where application functionality, memory, data storage and retrieval and various processing functions are operated remotely from each other over a distributed computing network, such as the Internet or an intranet. User interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects of the invention is practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 8 is described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A computer system comprising:
    a processing unit; and
    a memory storing computer executable instructions that, when executed by the processing unit, cause the computer system to:
        replicate a plurality of per-user databases for a plurality of users across a plurality of database servers linked across a network, wherein each of the plurality of the per-user databases comprises an electronic identity and an electronic mailbox of a single user of the plurality of users;
        upload and activate the plurality of per-user databases onto a denied, degraded, intermittent, or latent (DDIL) server, the DDIL server being located in a computing environment separate from computing environments of the plurality of database servers;
        when the DDIL server is not connected to the network, provide a client device of a first user of the plurality of users with an electronic identity of the first user and an electronic mailbox of the first user from a per-user database of the first user from the DDIL server, wherein the DDIL server allows the plurality of users from the plurality of per-user databases activated on the DDIL server to exchange electronic mail via the DDIL server while the DDIL server is not connected to the network; and
        when the DDIL server is connected to the network:
            synchronize the per-user database of the first user from the DDIL server across the network to the plurality of database servers; and
            provide the client device of the first user with the electronic identity of the first user and the electronic mailbox of the first user from a per-user database of the first user from one of the plurality of database servers.

2. The computer system of claim 1, further comprising computer executable instructions that, when executed by the processing unit, cause the computer system to:
    replicate the plurality of per-user databases across the plurality of database servers linked across the network according to a multi-master replication scheme; and
    asynchronously synchronize the plurality of per-user databases from the DDIL server across the network to the plurality of database servers.

3. The computer system of claim 1, wherein the plurality of per-user databases are encrypted.

4. The computer system of claim 1, further comprising computer executable instructions that, when executed by the processing unit, cause the computer system to:
    synchronize the plurality of per-user databases from the DDIL server across the network to the plurality of database servers when the DDIL server is connected to the network.

5. The computer system of claim 4, further comprising computer executable instructions that, when executed by the processing unit, cause the computer system to:
    throttle synchronization of the plurality of per-user databases from the DDIL server across the network to the plurality of database servers when the DDIL server is connected to the network.

6. The computer system of claim 4, further comprising computer executable instructions that, when executed by the processing unit, cause the computer system to:
    synchronize a per-user database of a second user from the DDIL server across the network to the plurality of database servers before synchronizing the per-user database of the first user from the DDIL server across the network to the plurality of database servers.

7. The computer system of claim 1, further comprising computer executable instructions that, when executed by the processing unit, cause the computer system to:
determine that a policy prevents synchronization of a per-user database of a second user of the plurality of users across the network to the plurality of database servers when the DDIL server is connected to the network.

8. The computer system of claim 1, wherein each of the plurality of users is part of an enterprise environment, the enterprise environment comprising an on-premises server that is linked to the network, the computer system further comprising computer executable instructions that, when executed by the processing unit, cause the computer system to:
replicate the plurality of per-user databases for the plurality of users to the on-premises server.

9. A method comprising:
associating an electronic identity and an electronic mailbox of a user having a single-user database;
replicating the single-user database via a multi-master replication scheme to a on-premises server in an enterprise environment and to a server in a denied, degraded, intermittent, or latent (DDIL) environment, wherein the on-premises server and the server in the DDIL environment are connected via a network;
when the server in the DDIL environment is connected to the network, providing a client device of the user with the electronic identity and the electronic mailbox from the single-user database stored on the server in the DDIL environment, wherein the server in the DDIL environment is configured for users in the DDIL environment to exchange electronic mail via the server in the DDIL environment while the server in the DDIL environment is not connected to the network; and
when the server in the DDIL environment is connected to the network, synchronizing the single-user database stored on the server in the DDIL environment to the on-premises server.

10. The method of claim 9, further comprising:
providing the client device of the user with the electronic identity and the electronic mailbox from the single-user database stored on the on-premises server when the server in the DDIL environment is connected to the network.

11. The method of claim 9, further comprising:
replicating a plurality of single-user databases via the multi-master replication scheme to the on-premises server in the enterprise environment and to the server in the DDIL environment.

12. The method of claim 11, further comprising:
synchronizing the plurality of single-user databases to the on-premises server when the server in the DDIL environment is connected to the network.

13. The method of claim 12, further comprising:
throttling synchronization of the plurality of single-user databases to the on-premises server when the server in the DDIL environment is connected to the network.

14. The method of claim 9, further comprising:
creating a plurality of single-user databases by:
dividing a multi-user identity database comprising a plurality of user identities into a plurality of single-user identity databases;
dividing a multi-user email database comprising a plurality of user mailboxes into a plurality of single-user mailbox databases;
matching each of the plurality of single-user identity databases to a respective one of the plurality of single-user mailbox databases based on a user identity; and
combining each of the single-user identity databases with a matching single user mailbox database.

15. The method of claim 9 further comprising:
activating the single-user database on the on-premises server when the user is not in the DDIL environment.

16. A computing device comprising:
a processing unit; and
a memory storing computer executable instructions that, when executed by the processing unit, cause the computing device to:
replicate a plurality of single-user databases for a plurality of users across a plurality of database servers linked across a network, wherein each of the plurality of the single-user databases comprises an electronic identity and an electronic mailbox of a user of the plurality of users;
upload and activate the plurality of single-user databases onto a denied, degraded, intermittent, or latent (DDIL) server in a DDIL environment;
when the server is not connected to the network, provide a client device of a first user of the plurality of users with an electronic identity of the first user and an electronic mailbox of the first user from a single-user database of the first user from the DDIL server, wherein the DDIL server is configured for the first user to exchange electronic mail with other users in the DDIL environment via the DDIL server while the DDIL server is not connected to the network; and
when the server is connected to the network, synchronize each of the single-user databases from the server across the network to the plurality of database servers.

17. The computing device of claim 16, further comprising computer executable instructions that, when executed by the processing unit, cause the computing device to:
provide electronic mail services to the plurality of users from the plurality of single-user databases from one of the plurality of database servers when the server is connected to the network.

18. The computing device of claim 16, wherein the DDIL environment is a secure computing environment and the plurality of single-user databases are encrypted.

19. The computing device of claim 18, wherein:
the synchronizing of each of the single-user databases from the server to the plurality of database servers is asynchronous.

20. The computing device of claim 16, further comprising computer executable instructions that, when executed by the processing unit, cause the computing device to:
replicate at least one of the single-user databases via a multi-master replication scheme to at least one cloud server connected to the network.

* * * * *